United States Patent Office 3,013,999
Patented Dec. 19, 1961

3,013,999
PROCESS FOR THE PRODUCTION OF RAPIDLY DRYING ESTERS
Johannes J. Zonsveld, Delft, Netherlands, assignor to Shell Oil Company, a corporation of Delaware
No Drawing. Filed Nov. 2, 1959, Ser. No. 850,093
Claims priority, application Netherlands Nov. 4, 1958
7 Claims. (Cl. 260—23)

The present invention relates to a process of the production of rapidly drying esters. More particularly, it relates to a process for producing air drying esters having a high proportion of octadecatrienoic acid radicals which contain conjugated double bonds.

Tung oil, particularly China-wood oil, on account of its high content (70–85%) of the highly unsaturated elaeostearic acid having three conjugated double bonds (9,11,13-octadecatrienoic acid), is very reactive and therefore a valuable starting material in the production of a rapidly air-drying lacquer. The drawback of this high reactivity, however, is that the trienoic acid gels rapidly on heating and becomes useless. Thus at 310° C. tung oil polymerizes to a solid in only 10 minutes.

In order to use tung oil in the production of lacquers according to present practice, the oil is usually mixed with less reactive components such as colophonium and soybean oil and then cooked. Thus excellent varnishes are obtained of which the drying time, however, is naturally increased by the content of less reactive components.

It is also known to use such a procedure in the esterification of polyols with tung oil fatty acid. Thus, for example, it is known that when it is desired to esterify polyvinyl alcohol with tung oil or oiticica oil fatty acids, the latter is preferably diluted with less unsaturated acids such as oleic acid.

A method has also been described of esterifying by means of the methyl ethyl ester of tung oil a high-molecular weight epoxy resin such as "EPIKOTE"-1004, which may be regarded as a polyol, the polyol being previously defunctionalized, however, with dehydrated castor oil fatty acid. Hence in this case also there is also a dilution with the less reactive dehydrated castor oil fatty acid.

A method has also been described for esterifying such a high-molecular weight epoxy resin, without previous defunctionalization, by means of the methyl ester of tung oil fatty acid with the use of special reaction conditions, viz. very low pressures of 2 mm. Hg. Although a reasonable amount of tung oil fatty acid may be combined with the polyol in this way, a pressure of 2 mm. Hg is far from attractive. Such a pressure is generally only practicable in the laboratory. The plant-scale vacuum units are usually incapable of reaching pressures lower than approximately 4 cm. Hg. The applicants have found that if an attempt is made to cook this epoxy resin with the methyl ester of tung oil fatty acid at normal pressure, the reaction mixture very soon gels.

Applicants have now found, quite unexpectedly, that a certain type of polyol may be esterified by means of the methyl ester of tung oil fatty acid or the like in a normal plant-scale unit without previous defunctionalization and without dilution with less reactive fatty acids. The result is a light colored binder which has a good stability during exposure to light and is suitable for use in very rapidly air-drying lacquers having a high binder content.

Thus the present invention provides a process of the production of rapidly drying esters comprising, reacting a copolymer allyl alcohol and a vinyl-aromatic compound containing 15 to 85% by weight of the vinyl-aromatic compound with an ester of an alcohol which is volatile under the reaction conditions and an octadecatrienoic acid having three conjugated double bonds, said reaction being conducted in the presence of from about 0.01 to about 1% by weight of an ester interchange catalyst and at a temperature of from about 150 to about 250° C.

The resinous polyols used in the process of the invention comprise the copolymers of allyl alcohol and alkenyl-substituted aromatic compounds containing from 15% to 85% by weight of combined vinyl-aromatic compounds and preferably 35% to 80% of combined vinyl-aromatic compounds.

The vinyl-aromatic compounds used in preparing the resinous copolymers include, among others, styrene, p-chlorostyrene, alpha-methylstyrene, p-methoxystyrene, p-butylstyrene, β-octylstyrene, vinyl toluene, 2,5-dibutylstyrene, beta-vinyl naphthlene, 2,4-dichlorostyrene and the like. Particularly preferred are styrene, and the nuclear chloro- and/or alkyl substituted styrene wherein the alkyl groups contain from 1 to 4 carbon atoms.

The resinous polyols are preferably prepared by heating a mixture of the allyl alcohol and the alkenyl-substituted aromatic compound at a temperature ranging from about 100° C. to about 250° C. in the presence of from about .1% to about 25% of a peroxide having a decomposition temperature in excess of 90° C., the quantity of the peroxide being based on the weight of the monomers.

The preferred procedure is to add the alkenyl-substituted aromatic compound in small increments during the course of the reaction. The addition is regulated so as to maintain the ratio of unreacted monomers substantially constant and thus permit the formation of a copolymer having uniform composition.

The ratio in which the alcohol and the alkenyl-substituted aromatic compounds may be combined at the beginning of the reaction and preferably maintained during the course of the reaction, may vary within wide limits. As the monomers differ in the rate of polymerization, the ratio of unreacted monomers will differ from the ratio in which the monomers appear in the copolymer and it will be necessary to run a few preliminary determinations to establish the ratio of unreacted monomers needed to give a copolymer of the desired composition. If allyl alcohol and styrene are the monomers and the catalyst is di-tert-butyl peroxide at a temperature of about 120° C., the relation of the ratio of unreacted monomers to finished copolymer composition may be illustrated by the following:

| Allyl alcohol-Styrene, Moles Unreacted monomer in Polymerization Mixture | Peroxide, Percent w. of Copolymer | Vinyl Aromatic, percent w. in Copolymer |
|---|---|---|
| 10:1 | 3.5 | 82 |
| 20:1 | 7.2 | 69 |
| 30:1 | 9.9 | 60 |
| 900:1 | 23.7 | 13 |

The peroxides employed in the polymerization are preferably those that are stable at temperatures above 90° C. Such peroxides include di-tertiary-butyl peroxide, hydrogen peroxide, tertiary-butyl hydroperoxide, cumene hydroperoxide, paramenthane hydroperoxide, tertiarybutyl perbenzoate and the like.

As noted, the peroxide is preferably utilized in an amount varying from 1% to 25% by weight of monomer, and preferably .1% to 10%. The exact amount used will depend on a number of considerations. One important consideration is the proportion of the unsaturated alcohol present as the polymerization proceeds—i.e. with higher concentrations of the alcohol greater amounts of peroxide are required. This in turn is related to the desired composition of the copolymer as described above. Another important consideration is the temperature at which the copolymerization is conducted. As a generalization, it may be stated that at higher temperatures, e.g., in the order of 160–180° C., the quantity of the peroxide required is lower, at lower temperatures, i.e., in the order of 120–130° C., the quantity of the peroxide required is greater.

The temperature employed will vary depending upon factors such as desired reaction time, amount of peroxide and the molecular weight of the finished copolymer. In most cases, the temperatures employed will vary from about 100° C. to about 250° C. Temperatures within this range give satisfactory reaction rates, can be used with economical amounts of peroxide catalyst and give products having molecular weights within the desired range, e.g., from about 500 to about 8,000 and preferably between 700 and 3,000. The molecular weights are determined ebullioscopically in dichloroethane.

After the copolymerization is complete, the reaction product may be worked up in any conventional manner to recover the copolymer and remove any unreacted monomer and by products. The separation may be accomplished by any means, such as, for example, distillation, extraction and the like.

The copolymer thus obtained is reacted with an ester of a volatile alcohol and a drying oil fatty acid as mentioned above. The reaction is of an ester interchange type and the presence of an ester interchange catalyst is desirable during the reaction. Suitable catalysts are the zinc salt of resin acid, calcium and zinc acetate, sodium methylate, sodium ethoxide and the like.

The reaction period required depends on the other reaction conditions. At a temperature of 200° C. a reaction period of 2 to 6 hours is generally sufficient. Too stringent conditions, viz. excessive heating at excessive temperature, should be avoided. Thus, the preferred reaction period is such that from about 40 to 80% of the chemical equivalent of ester is reacted.

The volatile alcohol separates from the trienoic acid ester during the reaction. In order to affect the reaction equilibrium favorably, the volatile alcohol is evaporated from the reaction mixture. Thus the preferred alcohol of the drying oil acid ester is methyl and the next preferred is ethyl. A suitable method of promoting this reaction consists of the addition of an agent such as n-heptane which forms an azeotrope with the volatile alcohol and lowers the partial pressure of the alcohol. In this case heptane also acts as an agent for excluding oxygen. In general, the lower alkyl ($C_1$–$C_4$) ester of any rapidly drying fatty acid having three conjugated double bonds and a long chain of carbon atoms of say about 18 carbon atoms is suitable for the present invention. For the acid component of the ester, tung oil fatty acid is preferably employed as the octadecatrienoic acid having three conjugated double bonds. In addition to 9,11,13-octadecatrienoic acid, tung oil fatty acid generally contains small quantities of saturated fatty acid, oleic acid, linoleic acid and linolenic acid. Another example of a fatty acid containing trienoic acid is oiticica oil fatty acid. Oiticica oil fatty acids contain licanic acid, which also has three conjugated double bonds (4-keto-1,11,13-octadecatrienoic acid), in an amount of, for example, 78% licanic acid. Thus it is seen that the fatty acid component need not be 100% pure octadecatrienoic acid having three conjugated double bonds but the higher the concentration of such acids, the better the resulting ester composition. Thus in accordance with the present invention, the fatty acid component of resin should contain at least 70 and preferably more than 75% of the above mentioned octadecatrienoic acids. The lower range of concentrations desirable is also affected to some extent by the nature of the fatty acids which are present along with those in the preferred class.

The copolymer and the esters may be reacted together in substantially chemical equivalent amounts. By chemical equivalent quantities are meant in this case stoichiometric quantities, a hydroxyl group of the copolymer being available for each ester group. Ester groups from any saturated acid present, and other unsaturated acids such as oleic acid, are included. Generally only a portion, preferably 40–80%, of the hydroxyl groups of the copolymer will be esterified.

The process according to the invention may be so modified that the ester interchange is carried out in the presence of a polycarboxylic acid or an anhydride thereof such as maleic anhydride, phthalic anhydride, etc. The maximum amount of polycarboxylic acid used is approximately 10% by weight (based on ester of volatile alcohol). When such a modification is used the total number of carboxylic groups of the polycarboxylic acid and the number of ester groups of the volatile alcohol should not exceed the number of hydroxyl groups of the copolymer.

The esters produced according to the invention dry exceptionally rapidly by exposure to air and the coatings exhibit a good hardness, flexibility, impact strength and resistance to water and solvents. The esters may be worked up into lacquers in the conventional manner by adding pigments, thinners and the like. As a result of the comparatively low viscosity of the esters of the invention lacquers may be prepared having a high binder content, viz. lacquers in which a smaller amount of solvent is required in order to attain the desired viscosity at which the lacquers are to be applied.

Since it is possible to operate at approximately atmospheric pressure, strictly speaking no additional vacuum equipment is required. Lowering the pressure, however, will promote the ester interchange reaction in which, as explained above, pressures of at least 4 cm. Hg will preferably be employed. It is, of course, also possible to carry out the reaction at very low pressures of, for example, 1–10 mm. Hg but this involves the drawback of costly vacuum equipment. It is also advisable to exclude oxygen during the reaction, for example, by the use of a nitrogen or other inert atmosphere.

In order to describe the invention in further detail, the following illustrative examples are given:

*Example I*

The starting material was a copolymer prepared by heating allyl alcohol and styrene by means of ditertiary butyl peroxide in a nitrogen atmosphere at 9 atm. pressure and 135° C., styrene being continuously supplied over a period of 5 hours. The resultant copolymer was a colorless solid having a melting point of 97° C., a molecular weight of 1150, contained 5 hydroxyl groups per molecule and had an equivalent weight per hydroxyl group of 222.

One hundred parts of the copolymer was reacted at 200° C. and atmospheric pressure in the presence of 0.05 part of zinc acetate and 67 parts of the methyl ester of tung oil fatty acid (81% elaeostearic acid). The methanol acid). The methanol formed was distilled off azeotropically by means of n-heptane. The reaction was discontinued after 4¾ hours.

In order to demonstrate the superior properties of this ester prepared according to the invention, two air-drying comparable esters were prepared from dehydrated castor oil fatty acid. One of them was prepared from the same copolymer, and the other was prepared from an epoxy resin which was the reaction product of diphenylol propane and epichlorohydrin having the following properties: melting point 100° C., molecular weight 1400, 8 OH groups per mol, and equivalent weight per OH group of 175.

The properties of the resultant esters are listed in the table below.

|  | Ester of copolymer+ tung oil fatty acid according to the invention | Ester of copolymer+ dehydrated castor oil fatty acid | Ester of "Epikote" 1004+dehydrated castor oil fatty acid |
|---|---|---|---|
| Esterified hydroxyl groups, percent | 51 | 51 | 40 |
| Fatty acid content, percent by weight | 39 | 39 | 39 |
| Viscosity at 25° C. of a 50% solution in xylene (poises) | 0.62 | 0.50 | 7.00 |
| Color of the 50% solution (Gardner) | 2 | 2 | 4 |
| Drying times of coatings of 50% solutions of the binder in xylene, with Pb-Co-naphthenate as drier (minutes): | | | |
| (a) no longer tacky | 14 | 60 | 25 |
| (b) dry and hard | 95 | 240 | 200 |

It will be noted from this table that the esters according to the invention have superior qualities. In particular the very short drying-time is noticeable. The lacquer coating obtained with the use of the ester according to the invention also exhibited a good hardness as well as a good resistance to water and gelling under the influence of sunlight.

For comparison it may also be stated that an attempt to esterify the copolymer with the free tung oil fatty acid was unsuccessful since the mixture gelled in the kettle.

*Example II*

The procedure of Example I is repeated in two runs except that the zinc acetate is replaced by calcium acetate in one run and sodium methylate in the other. Similarly good results are obtained.

I claim as my invention:

1. A process for the production of rapidly drying esters which comprises, reacting a copolymer of allyl alcohol and a vinyl-aromatic compound containing 15 to 85% by weight of the vinyl-aromatic compound with an ester of an alkyl alcohol having from 1 to 4 carbon atoms which is volatile under the reaction conditions and a fatty acid material containing more than 70% octadecatrienoic acid having three conjugated double bonds, said reaction being conducted in the presence of from about 0.01 to about 1% by weight of an ester interchange catalyst and at a temperature of from about 150 to about 250° C.

2. The process defined in claim 1, in which the reaction is carried out at a temperature between about 180 and 210° C.

3. The process defined in claim 1, in which the reaction is carried out in the presence of an agent which forms an azeotrope with the volatile alcohol.

4. The process defined in claim 1, in which the fatty acid material is tung oil fatty acid.

5. The process defined in claim 1, in which the copolymer is reacted with from about 40 to about 80% of the chemical equivalent quantity of esters of the volatile alcohol.

6. The process defined in claim 1, in which the vinyl-aromatic compound is styrene.

7. The process defined in claim 1, in which the copolymer is obtained by reacting allyl alcohol and a vinyl-aromatic compound at a temperature of from about 100 to 250° C. in the presence of from about 0.1 to 25% based on the weight of the copolymer of a peroxide having a decomposition temperature exceeding 90° C., said proportions of allyl alcohol in vinyl-aromatic compound being kept in a molar ratio between approximately 10 to 1 and 900 to 1 respectively by gradually adding the vinyl-aromatic compound incrementally during polymerization.

References Cited in the file of this patent

UNITED STATES PATENTS

| 2,894,938 | Chapin et al. | July 14, 1959 |
| 2,902,457 | Marsel et al. | Sept. 1, 1959 |